Aug. 22, 1961 G. FRIESE 2,997,286
FLUID BED FURNACE AND PROCESS
Filed Dec. 17, 1958
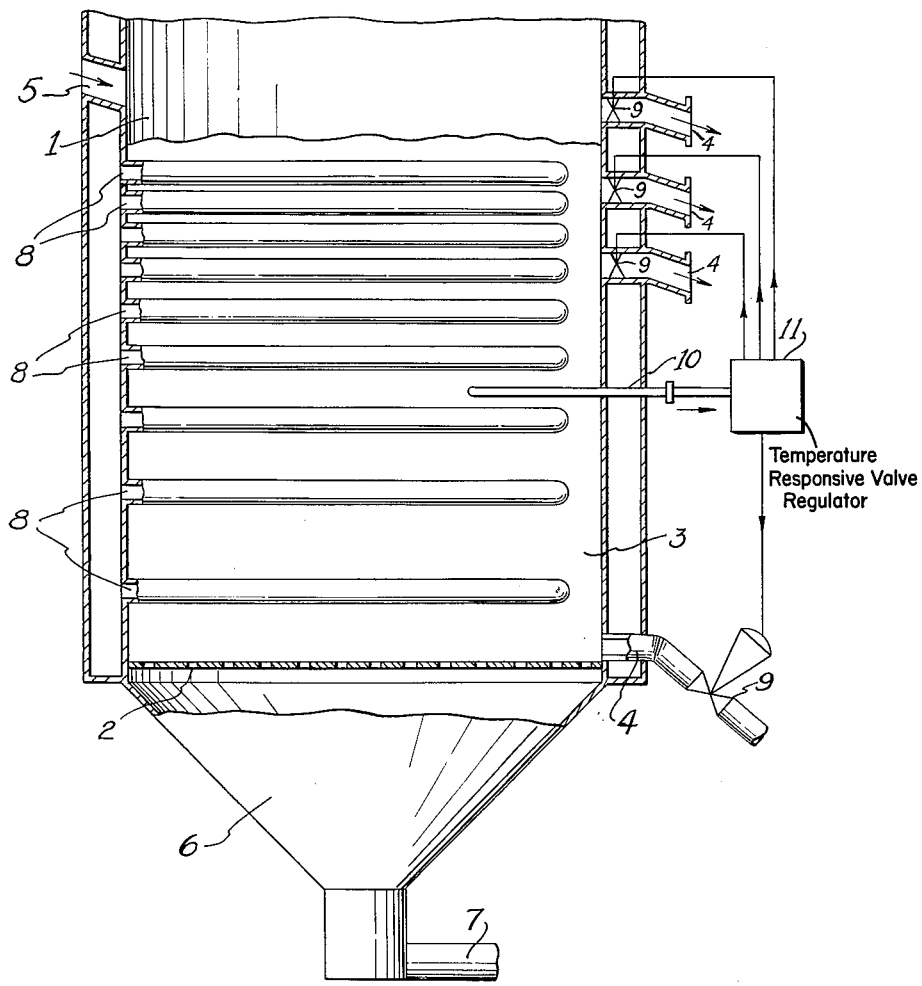
INVENTOR
Günter Friese
BY Bailey, Stephens & Huettig
ATTORNEYS

United States Patent Office 2,997,286
Patented Aug. 22, 1961

---

2,997,286
FLUID BED FURNACE AND PROCESS
Günter Friese, Frankfurt am Main, Germany, assignor to Metallgesellschaft Aktiengesellschaft, Frankfurt am Main, Germany
Filed Dec. 17, 1958, Ser. No. 781,047
Claims priority, application Germany Dec. 31, 1957
4 Claims. (Cl. 263—21)

This invention relates to the fluid bed roasting of materials.

It is known that the charge of material for the load in a fluid bed roasting furnace must be kept within a limited range if uniformly treated products and a uniform concentration of the gas is to be maintained. The lower limit is approximately given by the so-called Winkler point, that is the velocity of the gas at which the fluid bed movement begins. This gas velocity also determines the quantity of oxygen supplied to the bed, according to which the output of the bed is limited stoichiometrically. The upper limit is theoretically fixed by the discharge point, i.e. the gas velocity at which the solids are entrained with the gas from the bed. However, in practice, this upper limit is usually much lower because as the furnace charge is increased to a proportionately lesser extent a point is reached where sufficient heat cannot be withdrawn from the fixed heat withdrawing surface area of the bed, so that rises in temperature occur which cause the material to agglomerate into a solid mass which destroys the fluid bed.

Therefore, the lower limit of the charge for a fluid bed with respect to a specific material is about 80% of the normal output for which the furnace is designed, and the upper limit is approximately 120% of the normal output.

It is known, however, to mount cooling tubes in the zone above the upper surface of the not fluidized bed, that is in the space into which the bed expands during fluidizing. This has the advantage in that when the process is stopped no heat is withdrawn, and the furnace will remain hot for several hours. The disadvantage is in that only a proportionately small heat withdrawing surface can be entered into the bed so that the total throughput capacity of the furnace is not as large as in other types of furnaces.

The object of this invention is to produce a process and apparatus in which the throughput capacity of fluid bed furnaces for a certain kind of raw material is accomplished within much wider limits than heretofore.

In general, the objects are accomplished by maintaining the variable height of the bed in accordance with a novel arrangement of the cooling elements in the furnace. Thus the cooling elements are mounted so that the density of the cooling surfaces increases in proportion with the height of the fluid bed. This is done by spacing the cooling elements either or both horizontally and vertically so that they become closer together from the bottom grate to the surface of the fluid bed so that there are more cooling elements in the upper zone than in the lower zone of the bed. In that case of greater bed heights not only the total cooling surface is greater but also the ratio of the cooling surface to the volume of the bed is enlarged. On the other hand, this arrangement makes it possible to use a conically shaped furnace and fluid bed wherein the distance of the cooling tubes with respect to each other can be kept essentially constant as the height of the fluid bed in the furnace increases. The apparatus of this invention is operated so that, as the amount of material charged into the bed becomes greater, the height of the bed is increased. Discharge tubes for removing the treated material are accordingly arranged. In that manner further cooling tubes arrive within the range of the zone of the fluid bed, which, when the fluid bed is small, are above the bed, that is to say in the dust zone. As the value of heat transfer in the dust zone is about a tenth power lesser than in the fluid bed, the quantity of withdrawn heat is accordingly increased in the fluid bed. Thus the adjustment of the discharge can be coupled with the charging device in that manner that the height of the bed is automatically adapted to the particular charge, that is to say to the feeding velocity of the material to be roasted, so that a suitable maximum cooling surface is available under any load of raw material. Thus the rate of charging raw material into the bed can be used as a measuring means for automatic regulating of the height of the bed and which, for example, can be applied to a belt scale.

However the use of the temperature in the fluidized bed as measuring means is preferable. This presents the advantage that, even if in the case of constant loading for example the temperature tends to fluctuate, due to a change in the composition of the material to be treated a constant temperature is maintained in the fluidized bed and the temperature of the fluid bed is in any case equal to the increase because it is preferred to operate the furnace as closely as possible below the maximum permissible temperature.

A further advantage in this method of adjusting the height of the fluid bed is that, in addition to an increase in furnace output, the material remains in the furnace for a longer time in order to ensure a complete reaction. This method can be applied accordingly to other fluid bed processes, for example when roasting material containing carbon such as oil shale or others.

The means by which the objects of the invention are obtained are described more fully with reference to the accompanying drawing which shows a schematic cross-sectional view through a furnace constructed according to the invention.

The cylindrical fluid bed furnace consists of a shaft 1 having a bottom grate 2. Above the grate is the fluid bed zone 3. The discharge tubes 4 with adjustable closing elements 9 are provided for the roasting material. Raw material to be roasted by combustion is charged through pipe 5 into the furnace. Below grate 2 is a wind box 6 receiving cold or preheated roasting air from the conduit 7. Mounted within the furnace and in the fluid bed zone 3 are a plurality of cooling tubes 8. These tubes are so arranged that the total cooling surface area increases upwardly and proportionately as when the surface areas of the tubes are expressed in square meters and the volume of the fluid bed is expressed in cubic meters. 10 is a thermal element which continuously measures the temperature in the fluid bed. The closing elements 9 in the discharge tubes 4 being controlled by the temperature values through the intermediary of a regulator 11. When the roasted material is withdrawn from the upper zone of the fluid bed, the discharge takes place through the three upper discharge tubes, whereas the bottom discharge tube is employed, when the material is withdrawn from the bottom of the bed.

A rectangular, conical, or other form of furnace can be used as well as the cylindrical furnace shown.

*Example 1*

100 tons per day of pyrites, containing 48% S and of a grain size of 0–6 mm. are roasted in a fluid bed furnace having a grate area of 5 m.$^2$ and a cooling surface of 17.5 m.$^2$ at a temperature of 800° C. in the fluid bed and with a bed height of 80 cm. By increasing the height of the bed to 100 cm., a throughput capacity of 110 tons per day of the same material is attained also at a temperature of 800° C. In order to increase the height of the bed from 80 cm. to 100 cm. it is also necessary to increase the cooling surface by 50%, that is to 26.25 m.² Therefore, as shown in the drawing, six cooling tubes are effective in the case of a bed height of 80 cm. and nine cooling tubes in the case of a bed height of 100 cm.

*Example 2*

50 tons per day of oil shale containing 10% organic substance are roasted in a furnace with a grate area of 1 m.² at a maximum roasting temperature of 600° C. and in a bed height of 50 cm. By increasing the bed height to 80 cm., 75 tons per day of the same material has been roasted. According to the drawing three cooling tubes are effective in the case of a bed 50 cm. in height and six cooling tubes in the case of 80 cm. bed height. The heat exchange surface increases by 100% when the height of the bed is increased by 60%.

Having now described the means by which the objects of the invention are obtained,

I claim:

1. In a fluid bed furnace having spaced cooling tubes mounted in the fluid bed zone of the furnace and means for producing a fluid bed of adjustable height in said zone, the improvement wherein the number of tubes is increased from the bottom toward the top of said zone for increasing the total cooling area surface of said tubes at a rate greater than the increase in height of the bed of adjustable height toward the top of said zone.

2. In a fluid bed furnace as in claim 1, further comprising a plurality of outlet means in said furnace vertically spaced in said zone, and a valve in each outlet means for selectively discharging material from said bed as the height of said bed is adjusted.

3. In a fluid bed furnace as in claim 2, further comprising means for actuating each of said valves as a function of the temperature of the fluid bed in said zone.

4. In a fluid bed furnace as in claim 3, said number of tubes being increased by spacing said tubes more closely together in the upper portion of said zone than in the lower portion of said zone.

References Cited in the file of this patent

UNITED STATES PATENTS

| | | |
|---|---|---|
| 2,699,375 | Johannsen et al. | Jan. 11, 1955 |
| 2,735,744 | Rex | Feb. 21, 1956 |
| 2,755,782 | Campbell et al. | July 24, 1956 |
| 2,774,661 | White | Dec. 18, 1956 |

FOREIGN PATENTS

| | | |
|---|---|---|
| 776,791 | Great Britain | June 12, 1957 |